(12) United States Patent
Hnat et al.

(10) Patent No.: US 12,359,953 B2
(45) Date of Patent: Jul. 15, 2025

(54) LIQUID DISPENSING VALVE DEVICE

(71) Applicant: SMARTECH TOPICAL, INC., Santee, CA (US)

(72) Inventors: Andrew Hnat, San Diego, CA (US); Thomas Hnat, San Diego, CA (US)

(73) Assignee: SMARTECH TOPICAL, INC., Santee, CA (US)

( * ) Notice: Subject to any disclaimer, the term of this patent is extended or adjusted under 35 U.S.C. 154(b) by 189 days.

(21) Appl. No.: 18/256,167

(22) PCT Filed: Dec. 6, 2021

(86) PCT No.: PCT/US2021/061934
§ 371 (c)(1),
(2) Date: Jun. 6, 2023

(87) PCT Pub. No.: WO2022/125407
PCT Pub. Date: Jun. 16, 2022

(65) Prior Publication Data
US 2024/0060807 A1 Feb. 22, 2024

Related U.S. Application Data

(60) Provisional application No. 63/122,051, filed on Dec. 7, 2020.

(51) Int. Cl.
*G01F 11/26* (2006.01)
*F16K 21/08* (2006.01)

(52) U.S. Cl.
CPC ............ *G01F 11/265* (2013.01); *F16K 21/08* (2013.01)

(58) Field of Classification Search
CPC ................. G01F 11/265; F16K 21/08

USPC ........................................................ 222/380
See application file for complete search history.

(56) References Cited

U.S. PATENT DOCUMENTS

| | | | |
|---|---|---|---|
| 2,968,423 A * | 1/1961 | Mahler | G01F 11/268 |
| | | | 222/49 |
| 3,129,859 A * | 4/1964 | Chappell | G01F 11/265 |
| | | | 222/456 |
| 3,233,797 A | 2/1966 | Conry | |
| 3,993,218 A | 11/1976 | Reichenberger | |
| 4,407,435 A | 10/1983 | Harmon | |

(Continued)

FOREIGN PATENT DOCUMENTS

| | | | | |
|---|---|---|---|---|
| EP | 2390009 A1 * | 11/2011 | ........... | A47K 5/1202 |
| WO | 2022125407 A1 | 6/2022 | | |

OTHER PUBLICATIONS

International Search Report issued Apr. 4, 2022 in PCT/US2021/061934 (2 pages).

(Continued)

*Primary Examiner* — Paul R Durand
*Assistant Examiner* — Michael J. Melaragno
(74) *Attorney, Agent, or Firm* — Michael A. Whittaker

(57) ABSTRACT

The present invention recognizes that there exists a long felt need for devices that can dispense a compound in a measured aliquot, A first aspect of the present invention generally relates to a ball valve device. A second aspect of the present invention generally relates to a method of making a ball valve of the present invention. A third aspect of the present, invention generally relates to a method of dispensing a compound using a ball valve device of the present invention.

23 Claims, 10 Drawing Sheets

(56) References Cited

U.S. PATENT DOCUMENTS

| | | | |
|---|---|---|---|
| 4,690,313 A | 9/1987 | Luine et al. | |
| 4,921,112 A | 5/1990 | Juhlin et al. | |
| 4,984,719 A | 1/1991 | Brunton | |
| 5,961,008 A | 10/1999 | Peckels | |
| 8,056,764 B2 | 11/2011 | Paasch et al. | |
| 8,262,592 B1 * | 9/2012 | Brooks | A45D 34/041 |
| | | | 601/17 |
| 9,254,944 B1 * | 2/2016 | Peckels | B65D 25/48 |
| 11,261,010 B2 * | 3/2022 | Marciano | B01F 33/5011 |
| 2006/0108377 A1 | 5/2006 | Glynn et al. | |
| 2012/0097714 A1 * | 4/2012 | Hoefte | G01F 11/265 |
| | | | 222/477 |
| 2013/0270301 A1 * | 10/2013 | Schoubben | G01F 11/263 |
| | | | 222/207 |
| 2013/0334246 A1 | 12/2013 | Houck et al. | |
| 2017/0029177 A1 | 2/2017 | Holroyd et al. | |
| 2019/0046438 A1 * | 2/2019 | Hnat | A61K 9/0014 |
| 2024/0060807 A1 * | 2/2024 | Hnat | G01F 13/006 |

OTHER PUBLICATIONS

Written Opinion issued Apr. 4, 2022 in PCT/US2021/061934 (4 pages).

* cited by examiner

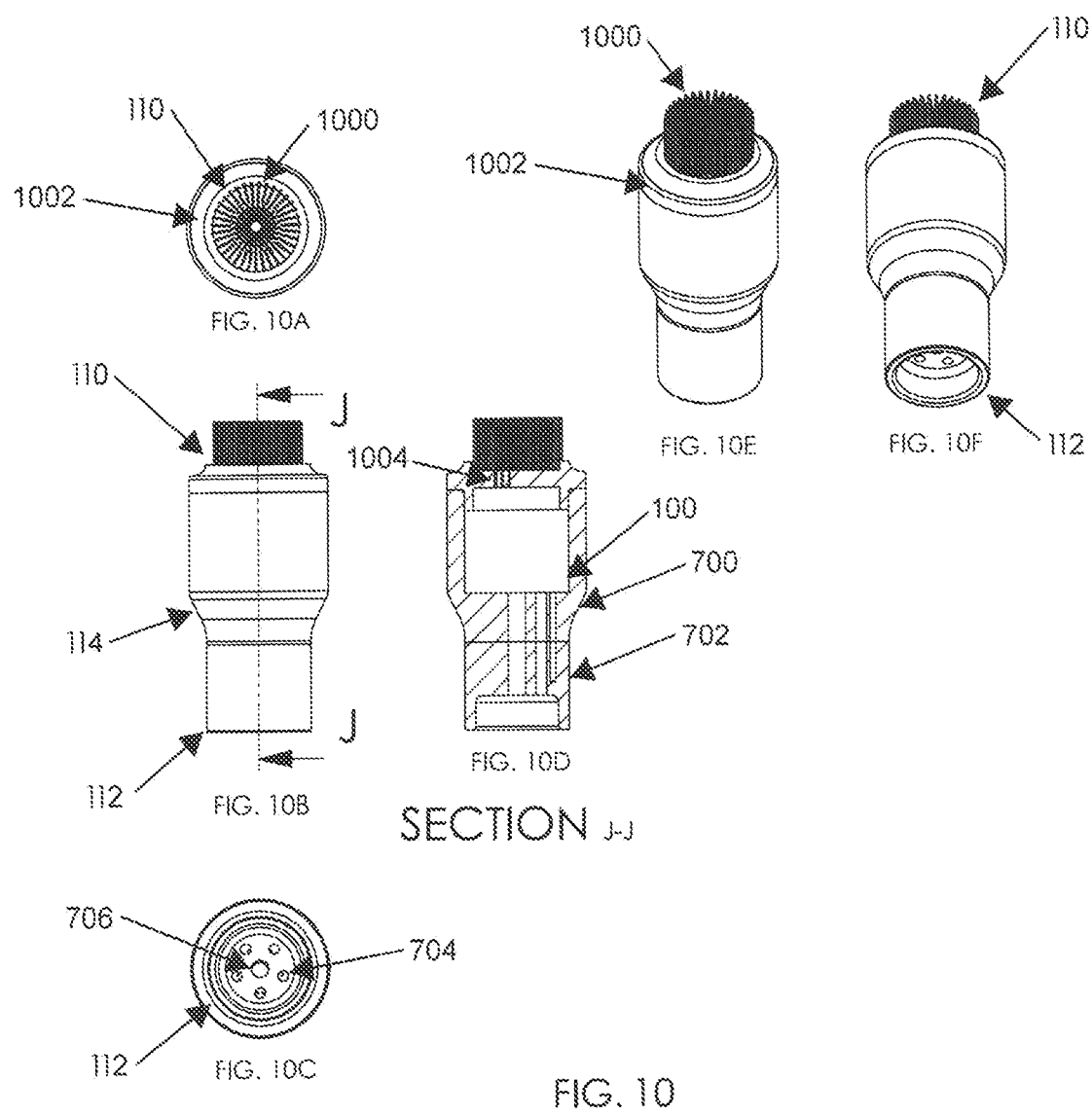

LIQUID DISPENSING VALVE DEVICE

The present invention is filed under 35 U.S.C. § 371 as the U.S. national phase of International Application No. PCT/US2021/061934, filed Dec. 6, 2021, which designated the U.S. and claims benefit of priority to U.S. Provisional application Ser. No. 63/122,051, filed Dec. 7, 2020, each of which is incorporated by reference in its entirety herein.

TECHNICAL FIELD

The present invention relates generally to the fields of devices that can dispense a compound in a measured aliquot.

BACKGROUND

Devices that regulate the dispensation of a material from a container have been part of the human condition perhaps since materials have been stored in containers. As time has progressed, we have moved forward from wine in earthenware with narrow necks and stoppers, to more advanced devices such as those found in laboratories and even artificial heart valves, not to mention the variety of dispensing devices around the home, such as those for hand soaps and hand sanitizers. Many of these devices do not have very accurate or precise dispensation volumes but are rather semi-quantitative at best. Thus, there exists a long felt need for a dispensation device that can accurately and conveniently dispense a desired amount of material, notably from a container that includes such material, where the materials are preferably liquid or fluid, but can be other materials as well such as powders, gels, sols, and the like Others have endeavored to provide such a dispending device, though they differ from the devices and methods of the present invention in materials respects.

Conry in U.S. Pat. No. 3,233,797, generally reports a gravity operated valve that includes a ball valve. This relatively simple device utilized a rather complex structure and method that relies on up vacuum and air locks and such to regulate a measured flow of materials such a spirits and utilizes a ball valve. A vent is apparently required for operation of this device. Furthermore, this device is somewhat unwieldy and unaesthetic, being in full view as opposed to being hidden from view.

Luine in U.S. Pat. No. 4,690,313, generally reports a device that regulates dispensation of material from a bottle of spirits. The device utilizes a plurality of chambers and moveable walls to adjust the volume of material dispensed from a container. Furthermore, this device is somewhat unwieldy and unaesthetic, being in full view as opposed to being hidden from view. This device utilizes a "filling chamber" to approximate the dose amount before it is poured.

Peckels in U.S. Pat. No. 5,961,008, generally reports a dispensing device for spirits that includes a ball valve and operates on air pressure control and related structures such as valves to control flow of fluid and air. Furthermore, this device is somewhat unwieldy and unaesthetic, being in full view as opposed to being hidden from view. Also, it is not possible for this device to be completely sealed for storage to either preserve the liquid substance and/or keep it from leaking if the container is tipped over.

Paasch in U.S. Pat. No. 8,056,764, generally reports a metered volume liquid dispensing device. The device apparently utilizes multiple chambers and pumps to dispense a desired amount of liquid from a container, such as liquid food stuffs. This device has a hand trigger to dispense and works as a piston pump device. This device relies on a hand trigger and spring actuated piston to pump liquid out at a desired quantity.

Houck in Published U.S. Patent Application No. 2013/0334246, generally reports a quid purer with timed illuminator. The device apparently utilizes a light to indicate the status and time of dispensation, the dispensation being controlled electronically.

The device of the present invention overcome many of the shortcomings of the devices discussed above and provides related benefits as well.

SUMMARY

The present invention recognizes that there exists a long felt need for devices that can dispense a compound in a measured aliquot.

A first aspect of the present invention generally relates to a ball valve liquid dispensing device.

A second aspect of the present invention generally relates to a method of making a ball valve liquid dispensing device of the present invention.

A third aspect of the present invention generally relates to a method of dispensing a compound using a ball valve device of the present invention.

BRIEF DESCRIPTION OF THE FIGURES

FIG. 1A, FIG. 1B, FIG. 1C, FIG. 1D, FIG. 1E, and FIG. 1F are various views of the device.

FIG. 2A, FIG. 2B, FIG. 2C, FIG. 2D, FIG. 2E, and FIG. 2F are various views of the device.

FIG. 3A. FIG. 3B, FIG. 3C, FIG. 3D, FIG. 3E, and FIG. 3F are various views of the device.

FIG. 4A, FIG. 4B, FIG. 4C, FIG. 4D, FIG. 4E, and FIG. 4F are various views of the device.

FIG. 5A, FIG. 5B, FIG. 5C. FIG. 5D, FIG. 5E, and FIG. 1F are various views of the device.

FIG. 6A. FIG. 6B, FIG. 6C, FIG. 6D, FIG. 6E, and FIG. 6F are various views of the device.

FIG. 7A, FIG. 7B, FIG. 7C, FIG. 7D, FIG. 7E, and FIG. 7F are various views of the device.

FIG. 8A, FIG. 8B, FIG. 8C, FIG. 8D, FIG. 8E, and FIG. 8F are various views of the device.

FIG. 9A, FIG. 9B, FIG. 9C, FIG. 9D, FIG. 9E, and FIG. 9F are various views of the device.

FIG. 10 generally depicts the rotatable dose-style device of FIG. 7 used in conjunction with a brush-on style applicator placed on top of the dosing reservoir. FIG. 10A. FIG. 10B, FIG. 10C, FIG. 10D, FIG. 10E, and FIG. 10F are various views of the device.

DETAILED DESCRIPTION OF THE INVENTION

Definitions

Figure 1:
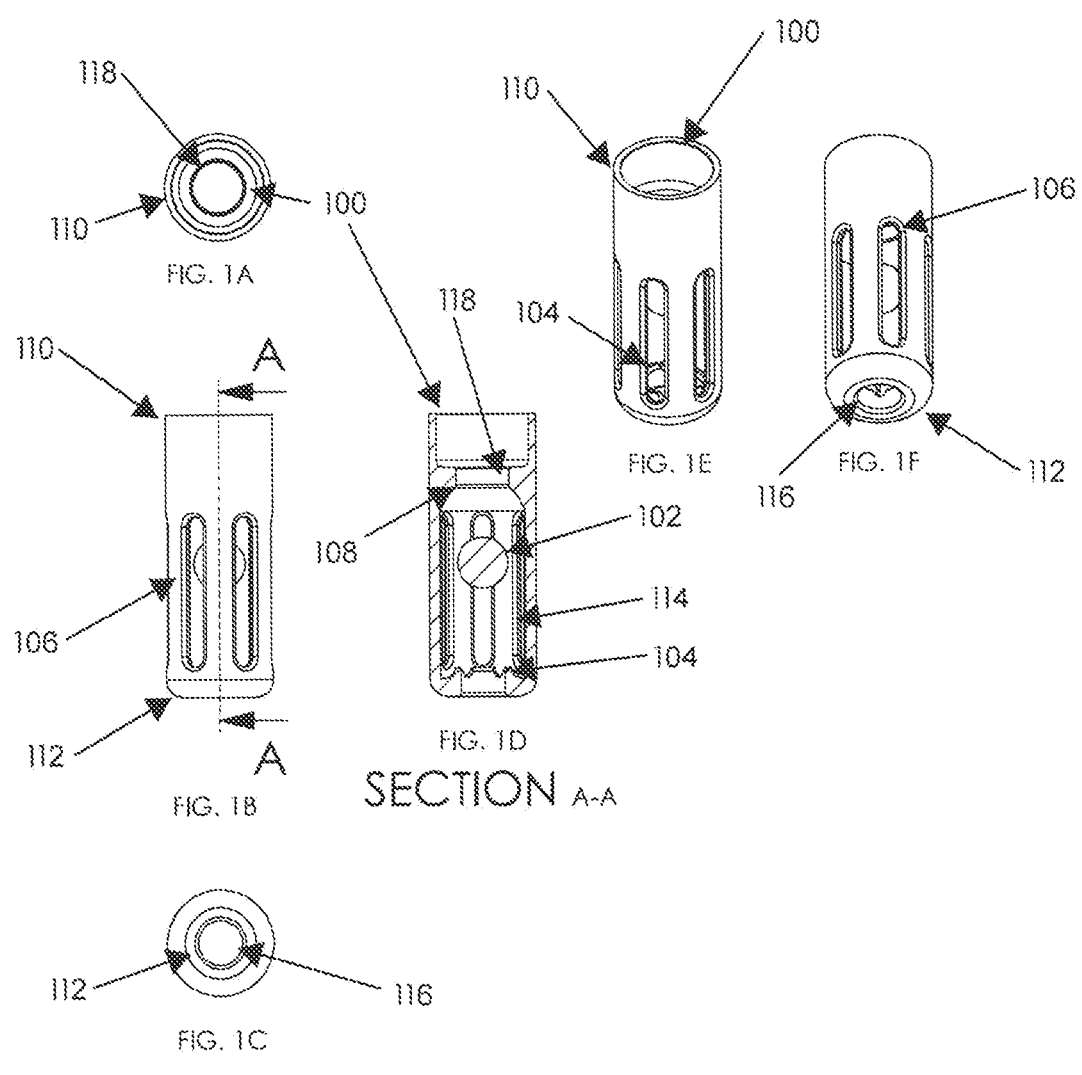
FIG. 1 generally depicts the tap-to-dose style device where a dosing object (ball bearing) is used inside the cage structure with a specifically toleranced seat/seal to hold the dosing object in place while the dose is being deposited out of the device.

Unless defined otherwise, all technical and scientific terms used herein have the same meaning as commonly understood by one of ordinary skill in the art to which this invention belongs. Conventional methods are used for these procedures, such as those provided in the art and various general references as they are known in the art. Where a term is provided in the singular, the inventors also contemplate the plural of that term, and where a term is provided in the plural, the inventors also contemplate the singular of that term. The nomenclature used herein and the laboratory procedures described below are those well-known and commonly employed in the art. As employed throughout the disclosure, the following terms, unless otherwise indicated, shall be understood to have the following meanings:

"Directly" refers to direct causation of a process that does not require intermediate steps.

"Indirectly" refers to indirect causation that requires intermediate steps.

"Dose" refers to a predetermined volume of liquid.

"Pour" refers to inverting the container to actuate the ball valve device.

"Liquid dispensing" refers to allowing the ball to traverse the cage structure path from the distal to proximal end to dispense a predetermined volume of liquid.

Other technical terms used herein have their ordinary meaning in the art that they are used, as exemplified by a variety of technical dictionaries.

INTRODUCTION

The present invention recognizes that there exists a long felt need for devices that can dispense a compound in a measured aliquot.

As a non-limiting introduction to the breath of the present invention, the present invention includes several general and useful aspects, including:
 1) a ball valve device, including at least one proximal end, at least one distal end, at least one caged structure, and at least one ball;
 2) a method of making a ball valve device of the present invention; and
 3) a method of dispensing compound using a ball valve device of the present invention.

These aspects of the invention, as well as others described herein, can be achieved by using the methods, articles of manufacture and compositions of matter described herein. To gain a full appreciation of the scope of the present invention, it will be further recognized that various aspects of the present invention can be combined to make desirable embodiments of the invention.

For example, the devices of the present invention can have at least two general non-limiting and illustrative variations. One is where the device can be inserted into an existing bottle neck and an existing standard cap can tighten over the device without the device being in view to the user. The other variation of this device can contain an integrated threaded flip cap that can be used to seal off the bottle/container when not in use.

Also, the devices of the present invention can be dosed directly out of the bottle/container the liquid substance is stored in without any intermediary filling chamber. The dose amount in the devices of the present invention can be controlled by the viscosity of the substance, the mass of the ball, the diameter of the ball, the length of the dosing ball track/cage, and the like.

In addition, the devices of the present invention can use the ball seated into the opening when inverted to cut off flow as the liquid is dispensed. This device can have a hinged closure on the top of the spout and an air pipe.

Furthermore, the device of the present invention can utilize one fluid ball and relies on specially shaped fluid inlet slots/holes along with one air exit hole to fill the device and have a smooth pour of material.

Also, the device of the present can have a plurality of general and specific variations, one where the device can completely be hidden underneath an existing bottle cap, and another variation where the device can be a one-piece integrated dosing device and cap. Both of these variations have the ability to have the liquid sealed off for preservation and to prevent spilling.

In addition, the device of the present invention can be operated by angling the container to initiate the movement of the fluid low ball based on gravity, buoyancy of the ball in the substance, rolling resistance, and the like. The amount of substance dispensed by or from a device of the present invention can be based on the mass of the ball, the size of the ball, the length of the device/track the ball travels through, the viscosity of the liquid, etc.

Furthermore, the device of the present invention need not rely upon any light to tell the user to stop pouring the substance. The device of the present invention can have the capability for the user to tilt the bottle, and the device itself will stop the fluid flow based on when the flow ball reaches the upper stop/seal. The user can essentially "lose focus" and the device will still pour the same amount.

I. Ball Valve Liquid Dispensing Device

The present invention includes a ball valve liquid dispensing device.

A first aspect of the present invention includes a ball valve device that includes: a) at least one proximal end, b) at least one distal end, c) at least one caged structure, and d) at least one ball; wherein said proximal end operably engages said caged structure; further when said distal end operably engages said caged structure; further wherein said ball can operably engage said proximal end, said caged structure, and said distal end; further wherein when said ball valve device is in operation by being operably engaged with at least one outlet of at least one container including at least one compound, wherein: a) when in a vertical position with said proximal end facing up, said ball is seated in said distal end of said ball valve device, and b) when tipped away from vertical to allow dispensation of said compound from said container, said ball transverses said caged structure in a timed manner to allow dispensation of an aliquot of compound before said ball operable engages said through hole to prevent further flow of compound.

A. Proximal End

In an aspect of the present invention, the proximal end includes at least one through hole to allow flow through of at least one compound.

In another aspect of the present invention, the proximal end is particularly adapted to operably engage at least one outlet of a container including the compound.

In a further aspect of the present invention, the proximal end is particularly adapted to substantially seal the through hole from flow of said compound when operably engaged therewith.

In an additional aspect of the present invention, the proximal end includes at least one concave portion to operably engage the ball. In general, this concave portion can operate to prevent the ball from sticking to the proximal end during operation of the device.

In an aspect of the present invention, the proximal end is made of one or more materials.

In another aspect of the present invention, the proximal end is made of one or more food grade materials, biocompatible materials, compostable materials, or a combination thereof.

In a further aspect of the present invention, the proximal end comprises polymer, plastic, metal, ceramic, glass, or a combination thereof.

In an additional aspect of the present invention, the proximal end is made by injection molding, 3D printing, additive printing or manufacture, negative printing or manufacture, lathing, laser etching, or a combination thereof.

B. Distal End

In an aspect of the present invention, the distal end includes at least one vent hole to allow fluid flow, gas flow, or a combination thereof.

In another aspect of the present invention, the distal end is partially adapted to not substantially adhere to said ball when in operation.

In a further aspect of the present invention, the distal end includes at least one protrusion to prevent said ball for substantially adhering to said ball when in operation.

The protrusions can also allow the ball to be raised up to help fluid drain from device when not in use.

In an additional aspect of the present invention, the proximal end is made of one or more materials.

In an aspect of the present invention, the proximal end is made of one or more food grade materials, biocompatible materials, compostable materials, or a combination thereof.

In another aspect of the present invention, the distal end includes polymer, plastic, metal, ceramic, glass, or a combination thereof.

In a further aspect of the present invention, the distal end is made by injection molding, 3D printing, additive printing or manufacture, negative printing or manufacture, lathing, laser etching, or a combination thereof.

Additive manufacture can include 3D printing and other digital printing. MEMS, and the like. Subtractive manufacturing can include MEMS, machining, CNC or hand driven, and the like.

C. Caged Structure

In an aspect of the present invention, the caged structure allows passage of the compound and can prevent air entrapment within said cage structure.

The caged structure can allow for material such as a liquid material to enter into the caged structure and for air to escape.

Also, it is desirable that in operation that the caged structure allows for the rapid filling of that structure with liquid, and the dispensation of that liquid, without substantial entrapment of air or other gas.

Structures that can allow for such flow of material include but are not limited to one or more holes, slots, mesh, screen, the like, or a combination thereof.

In another aspect of the present invention, the proximal end is made of one or more materials.

In a further aspect of the present invention, the proximal end is made of one or more food grade materials, biocompatible materials, compostable materials, or a combination thereof.

In an additional aspect of the present invention, the caged structure includes polymer, plastic, metal, ceramic, glass, or a combination thereof.

In an aspect of the present invention, the caged structure is made by injection molding, 3D printing, additive printing or manufacture, negative printing or manufacture, lathing, laser etching, or a combination thereof.

D. Hall

In an aspect of the present invention, the ball in configured to slide within and along at least a portion of the length of said caged structure.

The ball can slide or roll along at least a portion of the cased structure, which can add friction to the process and thus may need to be considered when considering the time of dispensation, which is related to the volume of material dispensed during operation of the device, in another aspect of the present invention, the proximal end is made of one or more materials.

In a further aspect of the present invention, the proximal end is made of one or more food grade materials, biocompatible materials, compostable materials, or a combination thereof.

In an additional aspect of the present invention, the ball includes polymer, plastic, metal, ceramic, glass, or a combination thereof.

In an aspect of the present invention, the hall is made by injection molding, 3D printing, additive printing or manufacture, negative printing or manufacture, lathing, laser etching, or a combination thereof.

E. Container

In an aspect of the present invention, the container is made of polymer, plastic, metal, ceramic, glass, or a combination thereof.

F. Compound

In an aspect of the present invention, the compound includes a liquid.

In another aspect of the present invention, the liquid is more viscous or less viscous than water.

In a further aspect of the present invention, the liquid includes an edible food stuff, a hand sanitizer, or a detergent.

G. Predetermined Aliquot of Compound

In an aspect of the present invention, the aliquot of compound is predetermined.

H. General Considerations

In an aspect of the present invention, the ball is made of one or more materials.

In another aspect of the present invention, the ball comprises polymer, plastic, metal, ceramic, glass, or a combination thereof.

In a further aspect of the present invention, the ball is made by injection molding, 3D printing, additive printing or manufacture, negative printing or manufacture, lathing, laser etching, or a combination thereof.

In an additional aspect of the present invention, the ball valve device is a unitary structure, or is made of more than one portion and assembled.

In an aspect of the present invention, the ball valve device is operably engaged with a cap or lid.

In another aspect of the present invention, the cap or lid is particularly adapted to operably engage said container.

In a further aspect of the present invention, the movement of the ball along said caged structure is not substantially impacted, impaired, or enhanced by a pressure differential related to air or gas.

In an additional aspect of the present invention, the volume of aliquot of compound dispensed from the at least one device is influenced by at least one variable, including: a) the viscosity of the compound; b) the length of the path that the ball travels: c) the weight of the ball; and d) a combination thereof.

I. Roll on Applicator

In an aspect of the present invention, the ball valve includes at least one roll on applicator.

In another aspect of the present invention, the roll-on applicator at least one reservoir II. Method of Making a Ball Valve Device A second aspect of the present invention includes a method of making a ball valve device, including: a) manufacturing each component of said ball valve device, individually or together, and b) if needed, assembling said each component to produce a ball valve device.

III. Method of Dispensing Compound Using a Ball Valve Device

A third aspect of the present invention includes a method of dispensing at least one compound from at least one container, including: a) providing at least one ball valve device of the present invention, b) providing at least one container comprising at least one compound, c) operably engaging said device with at least one outlet of said container, d) moving said container from a more upright and vertical position to a less upright and inverted vertical dispensing position to allow said ball to traverse the length of the cage to dispense an aliquot of compound, and e) optionally returning said container to a more upright vertical position after dispensation of said aliquot of compound.

An aspect of the present invention includes wherein said volume of aliquot of compound dispensed from said at least one device is influenced by at least one variable, including a) the viscosity of said compound, b) the length of the path of said ball, c) the weight of said ball, and d) a combination thereof.

EXAMPLES

These examples establish some preferred non-limiting aspects of devices, methods of making, and methods of using the present invention. See generally (FIG. 1 through FIG. 10)

One of the main functions of these devices is to dose a specific amount of liquid, gel, powder, etc. into another container or onto a substrate. The device can dose a specific amount of material into an attached container/reservoir to either be poured-out, rolled-on, brushed/wiped-on for various applications. The following section describes the different variations of the device design and how each one can dose a specific amount of material in different ways.

The following TABLE I addresses the element numbers in the figures.

TABLE I

| Element Number | Element Name | Element Description |
|---|---|---|
| 100 | Dosing Reservoir | Portion of device where the specific amount of dosed material is poured into. |
| 102 | Dosing Object/ Ball | An object, often but not limited to a spherical ball, which is used as a mean to block the dosing reservoir filling passageway(s) in order to dose a specific amount of material. |
| 104 | Raised Drain Tabs | Raised tabs on the lower portion of the device used to elevate the dosing object off of the lower hole to allow for excess material to drain out of the device and back into the main container the device is being used with. This is desirable under certain circumstances to prevent oxidation, drying, or contamination of any remaining material in the device after the dose has been evacuated. |
| 106 | Fluid Inlet Cutouts | These slots are to allow material to flow from the main container the device is inserted into through the dosing device and into the dosing reservoir. |
| 108 | Dosing Object Seat/Upper Stop/ Seal | This feature on the tap-to-dose device is used to temporarily fixate the dosing object just below the dosing reservoir after the desired dose amount has been achieved in the dosing reservoir. The dosing object lodged into the seat allows for no material to flow back into the main container and also to prevent excess material to enter the dosing reservoir to ensure an accurate dose amount each time. The dosing object seat's design can be dependent on the angle of the dosing seat as well as the hardness of the material used to capture the dosing object. |
| 110 | Proximal End | The proximal end of the device is positioned towards the opening of the container that the device is used with. When |

TABLE I-continued

| Element Number | Element Name | Element Description |
|---|---|---|
| | | the container is in the upright/resting position. the proximal end is facing up. |
| 112 | Distal End | The distal end of the device is positioned away the opening of the container that the device is used with. When the container is in the upright/resting position, the proximal end is facing down. |
| 114 | Cage/Housing/Track | This feature of the device is where the dosing object/ball traverses to either close off the dosing reservoir at the proximal end or leave the dosing reservoir open to fill the dosing reservoir at the distal end. When a dosing object/ball is not used for dosing, this feature is the main housing of the device used to house the other functional components of the device through which it allows the device to function as a material dosing device. |
| 116 | Drain Hole/Air Release | This feature of the device allows for excess material to drain back into the main container the device is used in and/or allow for air to escape to prevent an air lock from happening, which may binder material flow into the dosing reservoir. |
| 118 | Dosing Opening | This is the opening of the device where the dosed material flows out of the dosing reservoir into the final external container or onto the final external substrate to which the dose is applied. |
| 200 | Integrated Dose Device Cap | This is a cap featured on the dose devices that is integrated as an all-in-one device. The cap can but is not limited to including threads, press-fit, ribbed fit, etc. The cap can include, but is not limited to, a flip cap, rotatable cap, sliding cap, etc. |
| 300 | Mechanical Magnetic Switch Dose Device Outer Barrel | The outer barrel of the mechanical magnetic switch dose device is inserted into the container and remains stationary during device operation. The outer barrel also houses the dosing reservoir and parts of the upper and lower mechanical magnetic switches. The outer barrel incorporates filling slots that line up with the filling slots on the inner barrel to allow material to enter the dosing device to fill the dosing reservoir. |
| 302 | Mechanical Magnetic Switch Dose Device Inner Barrel | The inner barrel of the mechanical magnetic switch dose device is housed within the outer barrel of the device. The inner barrel rotates inside of the outer barrel which actuales either the upper or lower mechanical magnetic switches to attract the dosing object to either fill the dosing reservoir and seal off the dosing reservoir. The inner barrel houses the dosing object and incorporates filling slots as well to allow material to enter into the dosing device and finally into the dosing reservoir. |
| 304 | Rotation Pin | The rotation pin on this device is part of the device cap and the inner barrel. The rotation pin is what rotates the inner barrel inside of the outer barrel to align the mechanical magnetic switches in the desired position to attract the dosing object in either the filling or dosing position. |
| 306 | Device Cap | The device cap for the mechanical magnetic switch device is able to rotate around the upper portion of the outer barrel while maintaining a seal to prevent material from leaking out. The device cap also actuates the rotation pin which rotates the inner barrel within the outer barrel to the desired position to activate either the upper or lower magnetic switch. |
| 308 | Device Cap Pour Opening | The device cap pour opening is a piece that can be, but is not limited to, a hinge, a slide, a twist opening, etc. to evacuate the dosed material out of the dosing reservoir. |
| 310 | Lower Mechanical Magnetic Switch | The lower mechanical magnetic switch incorporates a combination of magnets and steel (or other appropriate material) pins clocked at a certain position to either engage or disengage the magnetic attraction across the steel pins. The lower magnetic switch is activated by the cap and rotation pin when the user wants to fill the dosing reservoir. |
| 312 | Upper Mechanical Magnetic Switch | The upper mechanical magnetic switch incorporates a combination of magnets and steel (or other appropriate material) pins clocked at a certain position to either engage or disengage the magnetic attraction across the steel pins. The upper magnetic switch is activated by the cap and rotation pin when the user wants to seal off the dosing reservoir when they want to evacuate the specific volume of dosed material and not allow any excess material to enter into the dosing reservoir. |
| 314 | Dosing Reservoir Filling Holes | These filling holes allow the passage of the dosed material from the inner barrel of the device into the dosing reservoir. When the dosing object is attached to the lower magnetic switch, material is able to flow through these holes until the |

TABLE I-continued

| Element Number | Element Name | Element Description |
|---|---|---|
| | | dosing reservoir is full. When the dosing object is attached to the upper magnetic switch, the filling holes are blocked and sealed by the dosing object which allows the user to evacuate the dosed material with no excess material entering the dosing reservoir. |
| 400 | Electromagnetic Switch | The electromagnetic switch is used to activate the upper or lower electromagnets to attract the dosing object in either the upper or lower position. |
| 402 | Upper Electromagnet | The upper electromagnet is integrated inside the main body of the dosing device. The upper electromagnet is activated when the user wishes to seal off the dosing reservoir from the rest of the container to dose the desired/specific amount of material with no excess being able to enter due to the dosing object being attracted to the upper magnet and blocking off the dosing reservoir filling holes. |
| 404 | Lower Electromagnet | The lower electromagnet is integrated inside the main body of the dosing device. The lower electromagnet is activated when the user wishes to fill the dosing reservoir without the dosing object blocking the dosing reservoir filling holes. The dosing object is held at the bottom end of the device when the lower electromagnet is activated allowing the dosing reservoir to be filled with material. |
| 406 | Electromagnet Battery/Electronics | The electromagnet battery and electronics are preferably integrated inside the main body of the dosing device. The battery can either be single-use or rechargeable and it is used in conjunction with the electromagnets and the electromagnet switch to power and activate the desired electromagnet depending on if the user is filling or evacuating the dosing reservoir with material. |
| 408 | Drain Holes | Drain holes are preferably incorporated into the device to allow excess material to evacuate back into the main container the dosing device is inserted into. This is preferable to prevent oxidation, drying, contamination of any remaining material in the device after the dose has been evacuated. |
| 410 | Device Cap | This is the integrated device cap that can be, but is not limited to, press-fit, thread fit, ribbed-fit, etc. to secure the cap to the device and prevent any material from leaking out of the device. |
| 500 | Mechanical Valve Rotation Knob/Pin | The rotation knob/pin is used to rotate the valve used in the mechanical valve device. It is integrated into the main body of the device and incorporates seals to prevent material from leaking out. There may be several positions, based on notches in the device design, which allow the valve to be fully closed, fully-open, or partially open/closed to allow or prevent material from entering the dosing reservoir. |
| 502 | Mechanical Valve | The valve used to either close or open the dosing reservoir to either fill or seal off the dosing reservoir can include, but is not limited to, a ball valve, butterfly valve, needle valve, gate valve, plug valve, diaphragm valve, knife-gate valve, axial valve, linear valve, globe valve, pinch valve, check/non-return valve, etc. |
| 600 | Electrical Valve Actuation Motor/Servo and Battery | This is a motor or servo style device integrated into the main body of the dosing device that can be activated to either close or open any of the previously listed style of valves to either open or seal off the dosing reservoir. The battery used to drive this electrical motor or servo can also be integrated into the same area. |
| 602 | Electrical Valve Motor Switch | This is a switch integrated into the main body of the dosing device to activate the motor that drives the valve to either open or seal off the dosing reservoir. |
| 700 | Rotatable Dose Device Upper Housing | The upper housing of the rotatable dose device is free-to-rotate and is used to either align or misalign the device filling holes to either fill or seal off the dosing reservoir from the main container the device is inserted into. The upper housing incorporates the dosing reservoir and is limited in rotation positions based on mechanical stops. This is done to only rotate the device to certain points to prevent over/under rotation of the device and not align the filling holes for the dosing reservoir. |
| 702 | Rotatable Dose Device Lower Housing | The lower housing of the rotatable dose device includes, but is not limited to, being pressed-fit, threaded, rib-fit, etc. into the main container the dose device is inserted into. The lower housing remains stationary while the upper housing rotates to the desired position to either fill or seal off the dosing reservoir. |

TABLE I-continued

| Element Number | Element Name | Element Description |
|---|---|---|
| 704 | Rotatable Dose Device Filling Holes | The filling holes on the rotatable dose device will need to be either aligned or misaligned to either fill or seal off the dosing reservoir from the rest of the device. The filling holes between the lower and upper housing will be aligned when the dosing reservoir is being filled. The filling holes between the lower and upper housing may be misaligned when the dosing reservoir needs to be sealed-off to prevent any excess material from entering the dosing reservoir. |
| 706 | Rotatable Dose Device Rotation Pin | This is the center pin of the rotatable dose device that allows the upper housing to rotate on top of the lower housing while still remaining attached to one another. It may be desireable for a seal to be incorporated between the rotation pin and/or the upper and lower housing to prevent material from leaking out. |
| 800 | Roll-On Dose Device Upper Cap | The roll-on dose device upper cap is used with the roll-on ball to dose a specific amount of material by rolling the material onto the final substrate. The tolerance between the cap and ball is important in being able to dose the material via the roll-on ball at the right rate based on the number of rotations of the ball. This cap includes, but is not limited to, being press-fit, ribbed-fit, threaded, etc. |
| 802 | Roll-On Dose Device Ball | The roll-on ball is used with the roll-on dose device to roll on a specific amount of dosed material from the lower dosing reservoir. The tolerance between the ball and cap is important in being able to dose the material onto the substrate via the ball at the right rate based on the materials viscosity and other fluid properties. |
| 900 | Spray-On Dose Device Cap | The spray-on dose device cap can, but is not limited to being, press-fit, ribbed-fit, threaded, etc. onto the top of a dosing device. The spray-on cap uses a pickup tube to spray the specific dosed material volume based on the amount of material inside the dosing reservoir. |
| 1000 | Brush-On Dose Device Brushes | The brush-on dose device brushes are used at the top of the device to brush on the specific volume of dosed material onto the substrate. |
| 1002 | Brush-On Dose Device Cap | The brush-on dose device cap is used with the brush-style dosing device. The brushes of the device are preferably fixed to the cap. This cap includes, but is not limited to, being press-fit, ribbed-fit, threaded, etc. |
| 1004 | Brush-On Dose Device Cap Dose Holes | These holes on the cap of the brush-on dose device cap allow the dosed material from the dosing reservoir to pass through the cap and be dispersed into the brushes to be brushed on to the final substrate by the user. The holes evenly distribute the dosed material throughout all of the brushes on the cap for even coverage. |

Example 1

Device Features/Mechanisms

A. Tap-to-Dose Device (FIG. 1)

The tap-to-dose device of the present invention utilizes a spherical ball to cut off the flow of material into the dosing reservoir. The spherical ball sits inside of the inner cylinder of the device and can travel up and down the inner cylinder depending on the tilt position of the container and device. There are cut out, openings on the lower cylinder to allow material to flow into the dosing de, ice from the main container the dosing device is placed in, on, or a combination thereof. When the device/container is sitting upright, the dosing ball rests at the bottom of the lower cylinder of the device. At the bottom of the inner cylinder there are raised drain tabs that allow the ball to stay elevated off of the lower surface to allow residual material to drain and empty from the device when the device is not being used. On the upper end of the device, there is a specifically shaped and toleranced chamfer/radius/cutout that is sized to hold the dosing ball in place when the device is tapped or shaken in the upside-down position. The tapping/shaking motion with the device in the upside-down position, lodges the dosing ball into the uniquely shaped and toleranced dosing ball cutout to seal off the flow of material into the dosing reservoir. The material and tolerances chosen between the dosing ball and the device are critical to lodging the ball in a consistent manner to cut off the flow of material.

Above the inner cylinder of the dosing device is a dosing reservoir. The dosing reservoir is sized and shaped depending on the desired dosing volume. Before the ball is lodged in the dosing cut out of the inner cylinder, the material flows into the dosing reservoir. Once the dosing reservoir is completely filled, the dosing volume has been reached and the device can then be tapped or shaken to lodge the ball in the dosing cut out of the lower cylinder of the device to close off the dosing reservoir from the rest of the device and container. This provides that no extra material flows into the dosing section of the device and a consistent amount of material is dosed each time. Once the dosing reservoir has been sealed off by the dosing ball by tapping or shaking the device, the device cap or lid can be opened, and the dosed amount of material can be emptied into the desired container. The Tap-to-Dose device can either be inserted within the neck of an existing bottle/container and the pre-existing cap can be used, or the device can attach and rest above the existing neck of the container with its own cap, lid, seal.

Key Terms

Dosing Ball
Lower Cylinder
Drain Tabs
Dosing Ball Cutout
Dosing Reservoir

Figure 2:
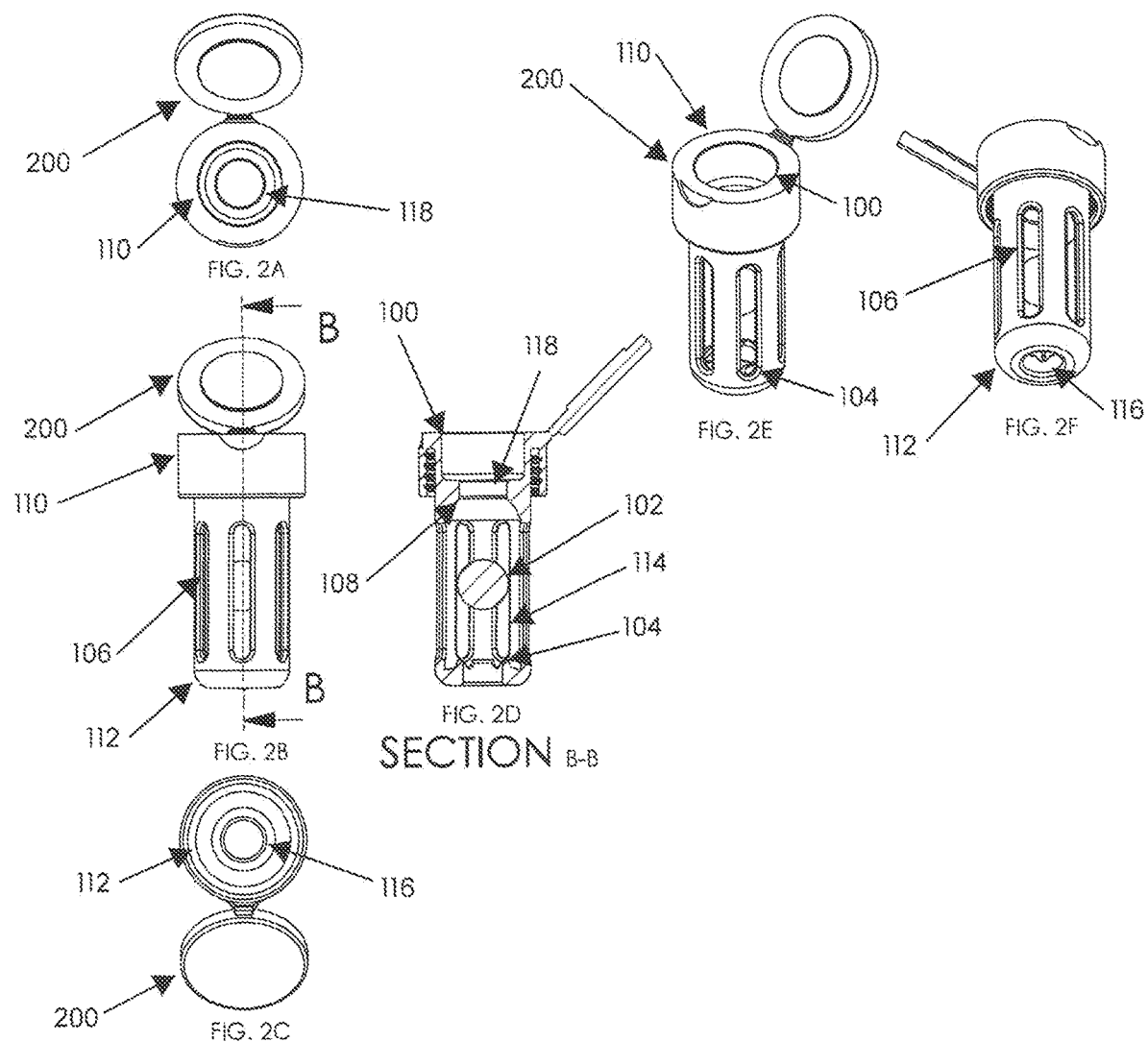
FIG. 2 generally depicts the device as in FIG. 1, but in this configuration, a cap is integrated as part of the main housing/cage structure of the dosing device.

B. Capped Ta-to-Dose Device (FIG. 2)

The capped Tap-to-Dose device of the present invention uses the original Tap-to-Dose device as the base design. The main function of the capped Tap-to-Dose device is the same, substantially the same, or similar to the device provided in Example 1 through Example 4, however, this variation incorporates an integrated threaded, flip-cap, slide cap, etc. as part of the device so an additional cap does not need to be adapted to attach to the top of the device.

Figure 3:
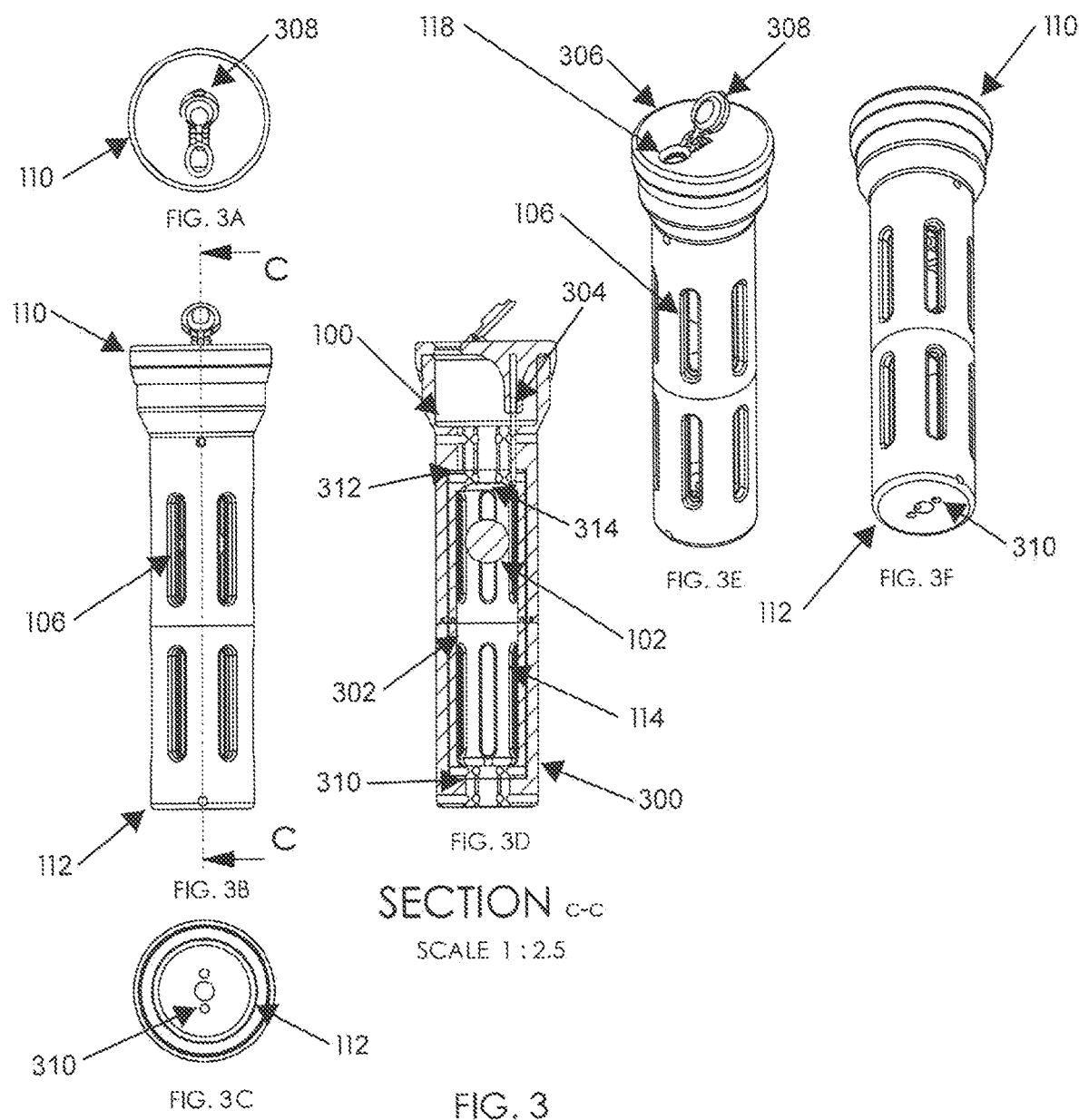
FIG. 3 generally depicts the mechanical magnetic switch dose device that uses a dosing object (ball bearing in this instance) in conjunction with two magnetic switches that work in opposite of each other to either magnetically attract the dosing object to the proximal end of the device, during dosing reservoir filling, or to the distal end of the device, to seal off the dosing reservoir for when the dose is being deposited out of the device.

C. Mechanical Magnetic Switch Dose Device (FIG. 3)

This version of the dosing device of the present invention uses mechanical magnetic switches to switch the position of the dosing object to either fill or seal off the flow of material into the dosing reservoir. In this device setup the dosing object does not necessarily have to be a sphere/ball, it can be a cylinder, a flat disc, a rectangular prism/cube, a triangular prism, etc. The dosing object does optionally have to be attracted to a magnet, however. In this device setup, of the present invention there are preferably two magnetic switches (though fewer or more are contemplated), one placed at the lower part of the device, and one placed at the upper part of the device near the dosing reservoir. There is an inner cylinder and an outer cylinder, the inner cylinder is placed within the outer cylinder and can rotate independently of the outer cylinder. On both cylinders there are cut outs that allow material to enter into the dosing device from the main container the device is placed in/on. The inner and outer cylinders rotate around a common axis and share a metal pin on the top and bottom of the device as a way to rotate the cylinders relative to each other. On the top and bottom section of the magnetic switch dosing device, there are magnets placed in an alternating manner to switch the position of the magnetic poles based on the clocking and rotation of the inner and outer cylinders. The magnets placed transverse from the main axis of the cylinders mate up with the center rotation pin and outer pins to complete the magnetic field. The upper and lower magnetic switches are activated in opposite positions. When the lower magnetic switch is activated, the upper magnetic switch is deactivated. When the upper magnetic switch is activated, the lower magnetic switch is deactivated. The magnetic switches working in opposite of each other allow the dosing object (ball/sphere, disc, etc.) to travel within the inner cylinder to either allow material to flow into the dosing reservoir, or seal off the dosing reservoir from the rest of the container once the dosing reservoir has been filled. When the user wishes to till the dosing reservoir at the top of the device, the inner cylinder is rotated within the outer cylinder to the position that activates the lower magnetic switch. When the lower magnetic switch is activated, it secures the dosing object to the lower part of the device. This allows material to freely flow into the dosing reservoir through the filling holes at the top of the device when the device is turned upside down. Once the material has completely filled the dosing reservoir to the desired amount, the inner cylinder is then rotated within the outer cylinder to the other position that then activates the upper magnetic switch inside the device. When the upper magnetic switch is activated, this then attracts the dosing object to the upper end of the device and the force from the magnet holds the dosing object against the upper end of the device. The dosing object covers the filling holes to the dosing reservoir above and prevents material from flowing in and out of the dosing reservoir. This allows for consistent filling of the dosing reservoir for a consistent amount of material to be dosed each time. The inner cylinder is rotated within the outer cylinder of the device using rotation tabs that are actuated with mating rotation tabs on the cap of the device. When the user wishes to switch the magnetic switch that is activated, they can push down and rotate the cap of the device to either activate the upper or lower magnet. When the user pushes down and rotates the cap, the rotation tabs on the cap push against the rotation tabs that are attached to the inner cylinder that pass through the outer cylinder into the dosing reservoir using specially shaped slots. The rotation tabs stop when the device is rotated into position A or B to activate the upper or lower magnetic switches. The user would know what position the device is in and which magnetic switches are activated based on markings on the container/cap. Once the user has filled the dosing reservoir and the upper magnetic switch is still activated, the user can rotate the cap without pushing down, which allows the cap to rotate off without contacting the rotation tabs. The dosing reservoir is then exposed, and the dosed material can be poured out of the dosing device. This variant of the dosing device of the present invention also incorporates drain tabs on the lower portion of the inner cylinder to allow excess material to drain/flow back into the main part of the container. The lower magnetic switch holds the dosing object at the drain tabs when the dosing device is not being used. This aspect of the device of the present invention can either be inserted into an existing container neck/shape or placed on top of an existing container and secured via threads, press-fit, clamp fit, etc. just like the tap-to-dose device. This allows either a custom or pre-existing cap or lid to be used.

Key Terms

Figure 4:
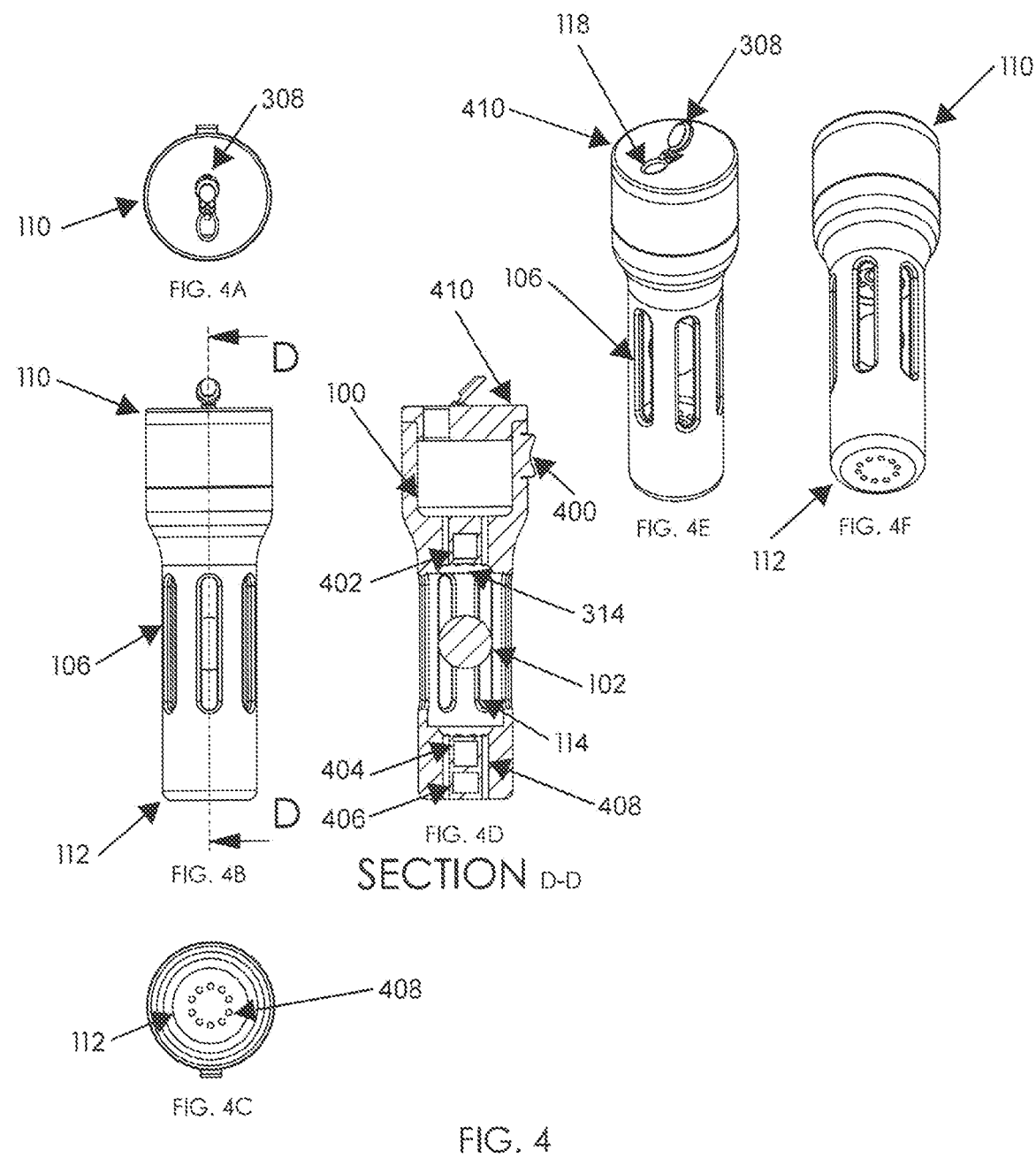
FIG. 4 generally depicts the electromagnetic switch dose device that uses a dosing object (ball bearing in this instance) in conjunction with two electromagnets that work in opposite of each other to either magnetically attract the dosing object to the proximal end of the device, during dosing reservoir filling, or to the distal end of the device, to seal off the dosing reservoir for when the dose is being deposited out of the device which can all be operated by a switch on the external face of the device.

Mechanical Magnetic Switches
Dosing Object
Dosing Reservoir
Inner Cylinder
Outer Cylinder
Filling Holes
Rotation Tabs
Drain Tabs D. Electromagnetic Switch Dose Device (FIG. 4)

The function of this version of the device of the present invention is similar to the function of the mechanical magnetic switch device. However, in this version the magnetic switches are operated via electromagnets. Instead of a mechanical magnetic switch being activated by an inner cylinder rotating within an outer cylinder, the magnets at the top and bottom of the device operate via an electromagnet. A two-way switch mounted to the outside of the container/device can turn on and off either the top or bottom electromagnet. Using batteries, either replaceable or rechargeable, a current/voltage is sent through the electromagnets to activate them. When the electromagnet at the bottom end of the device is activated, it holds the dosing object (as mentioned previously) at the bottom of the dosing device chamber/cylinder. This allows the dosing reservoir to fill via the cutouts on the side of the device and the filling holes at the top end of the device. When the dosing reservoir is full, the electromagnet switch is flipped by the user and the electromagnet at the bottom end of the device turns off and the electromagnet at the top end of the device turns on. This attracts and secures the dosing object to the top end of the device, which in turn, blocks of the dosing reservoir filling holes. With the dosing object blocking the dosing reservoir filling holes, no material can drain out of the dosing reservoir before the user empties the dosing reservoir into/onto the desired external container or substrate, which allows for consistent and repeatable dosing amounts. Using this setup also requires the dosing object to be attracted to a magnet, similar to the mechanical magnetic switch dosing device design of the present invention. This device design also incorporates drain tabs at the lower end of the device to allow excess material to empty/drain out of the dosing device when not in use by slightly elevating the dosing object off of the bottom surface of the dosing device when the lower electromagnet is activated. This device can also either be inserted into an existing bottle/container or attached on top of an existing bottle/container using threads, press-fit, clamp fit, etc. This allows either a custom or pre-existing cap or lid to be used.

Key Terms

Figure 5:
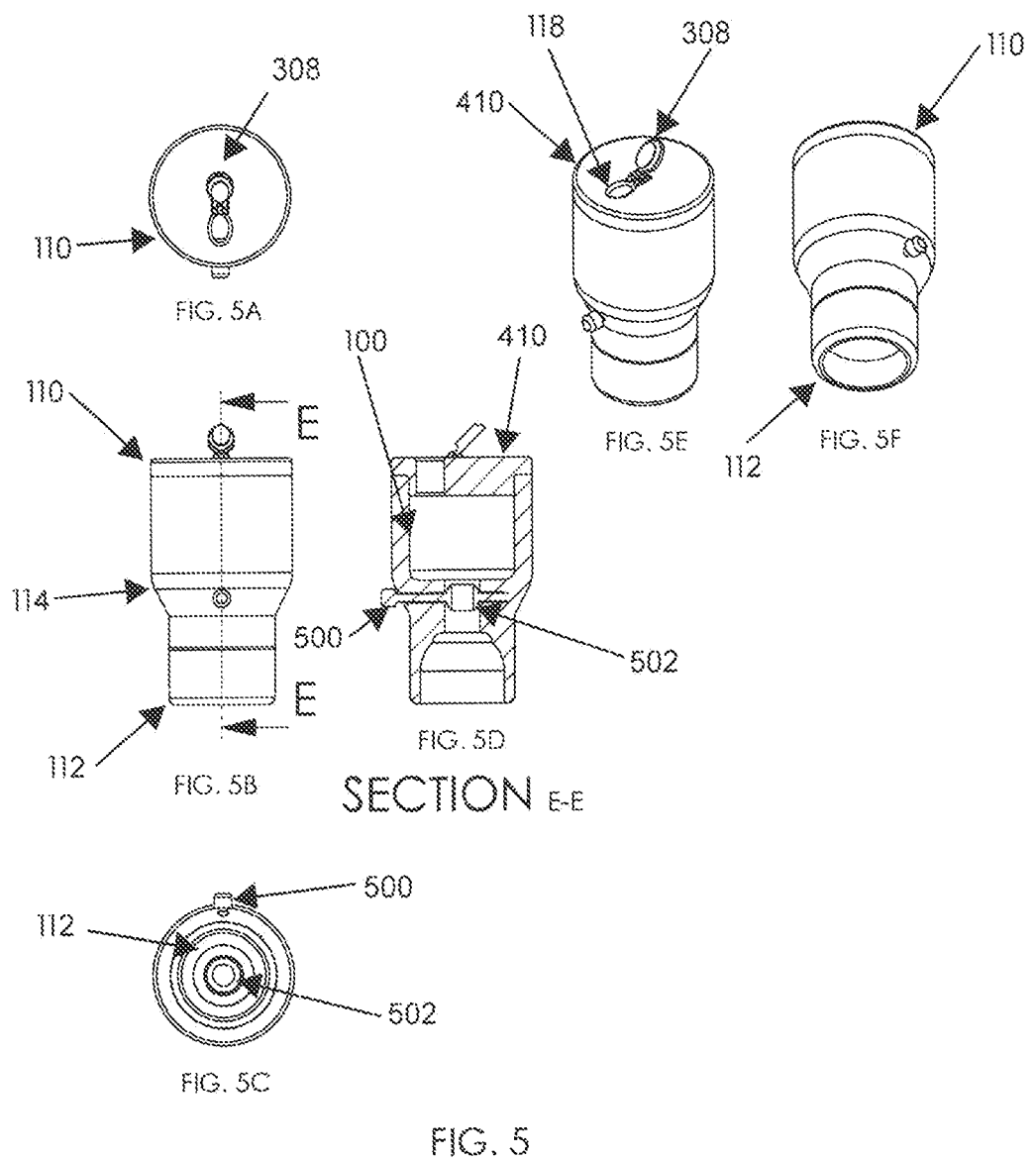
FIG. 5 generally depicts a mechanical valve/flap dose device that can utilize any kind of mechanical flap or valve to open or close the dosing reservoir using manual mechanical input depending on if the user wants to fill the dosing reservoir or empty the dosing reservoir by depositing the dosed material out of the container.

Electromagnets
Two-Way Switch
Dosing Object
Dosing Reservoir
Filling Holes
Drain Tabs E. Mechanical Valve/Flap Dose Device (FIG. 5)

This variant of the device of the present invention operates using a mechanically driven valve or flap to open the channel to till the dosing reservoir. The mechanical valve/flap can be, but are not limited to, the forms of a: ball valve, butterfly valve, needle valve, gate valve, plug valve, diaphragm valve, knife-gate valve, axial valve, linear valve, globe valve, pinch valve, check/non-return valve. All of these various types of valves can be incorporated into the device, individually or in combination, to cut the flow of material off from the main container into the dosing reservoir after the reservoir has filled and the user wishes to evacuate the material from the dosing reservoir without extra material draining in from the main part of the container, which would inherently change the dosing amount. In this variant of the dosing device, no parts are electronically powered. The valves can be actuated/operated via manual mechanical user input by twisting/rotating, pushing, pulling, etc. to close or open the valve to either till the dosing reservoir or close-off the dosing reservoir. Again, this device can either be inserted into the neck of an existing bottle/container, or secured to the top (externally) of an existing container either using threads, a press-fit, clamp fit, etc. This allows either a custom or pre-existing cap or lid to be used.

Key Terms

Figure 6:
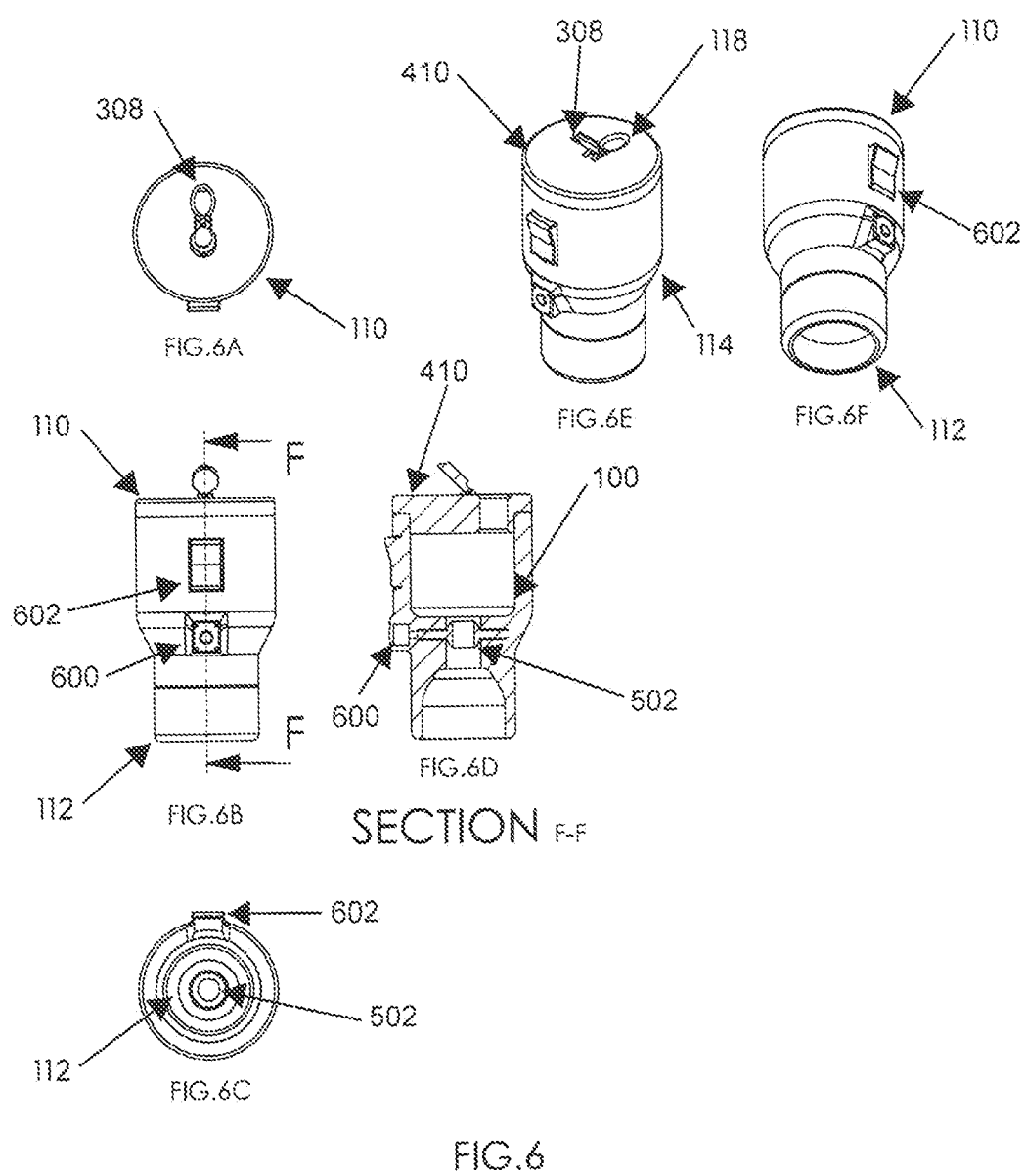
FIG. 6 generally depicts a switch-driven electrical valve/flap dose device that can utilize any kind of mechanical flap or valve to open or close the dosing reservoir using electrical input from a battery and servo-motor depending on if the user wants to till the dosing reservoir or empty the dosing reservoir by depositing the dosed material out of the container.

Mechanically Driven Valve or Flap
Ball Valve
Butterfly Valve
Needle Valve
Gate Valve
Plug Valve
Diaphragm Valve
Knife-Gate Valve
Axial Valve
Linear Valve
Globe Valve
Pinch Valve
Check/Non-Return Valve F. Electrical Switch/Valve/Flap Dose Device (FIG. 6)

This variation of the device of the present invention is similar to the previous mechanically driven valve/flap dose device of the present invention. In this variation, however, all of the possible valves previously provided, and others as well, can be driven by electrical devices using either replaceable or rechargeable batteries. The batteries, in conjunction with any type of motor, actuator, etc. would work to actuate the valve instead of the user manually actuating the valve.

Figure 7:
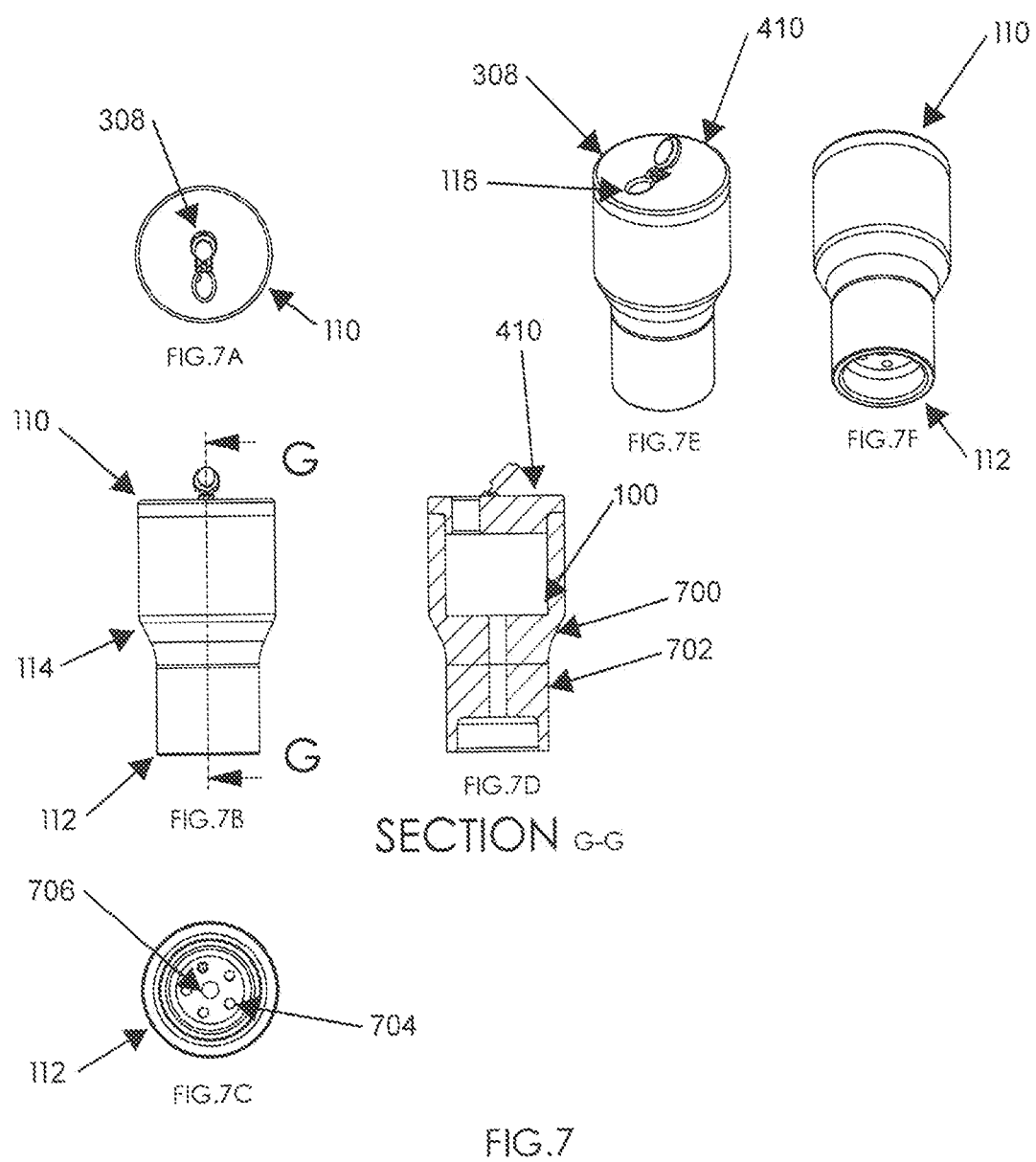
FIG. 7 generally depicts a rotatable dose device that uses a two-piece design where the upper and lower housings are attached by a common center shaft but rotate independently of each other to either align or misalign the filling holes to either fill or seal-off the dosing reservoir.

G. Rotatable Dose Device (FIG. 7)

This variant of the dosing device of the present invention uses a two-part device design where rotation is involved to either open or close the dosing reservoir filling cutouts. The lower portion of the device can have flow cutouts to allow material to flow into the lower dosing device housing from the main part of the container it is inserted or attached to, similar to the previous variants of the device. In this variant, the lower portion of the dosing device will remain fixed in place and has holes that will line-up with the upper portion of the dosing device. The upper and lower portion of the device are connected via a common shaft/pin on the center axis, which allows the upper portion to rotate over the lower portion. When the user wishes to fill the dosing reservoir the holes on the upper and lower portion of the device will be aligned via indicators on the device. With the filling holes aligned, material can flow from the main container to the dosing reservoir. Once the dosing reservoir has been filled, the user will rotate the device again to the desired position to misalign and close-off the dosing holes between the upper and lower portion of the device. This can ensure that material does not drain out of the dosing reservoir and no additional material drains into the dosing reservoir, both providing a possible scenario to dose an inconsistent amount. Rotation tabs can be incorporated into the device/cap design to ensure the device does not over/under rotate to not properly align the filling cutouts. In between the upper and lower portion of the rotatable dosing device, a seal is placed to prevent any leaking from occurring between the upper and lower portion and the filling holes. The dosing alignment cutouts on the upper and lower portions of the device can be, but are not limited to being, circles, squares, ovals, slots, triangles, rectangles, diamonds, etc. The optimal shape of these holes will be dependent on the viscosity/coarseness of the material being dosed. A cap can also be integrated into the design of this device, just like all of the previous variants to eliminate the need for additional caps to be paired with the device. This device can also be either inserted into the neck of an existing bottle/container or secured (externally) to an existing bottle container by threads, press fit, clamp fit, etc. like all of the other variations of this dosing device. This allows either a custom or pre-existing cap or lid to be used.

Key Terms

Filling Cutouts
Lower Portion
Upper Portion
Common Shaft/Pin
Rotation Tabs

Figure 8:
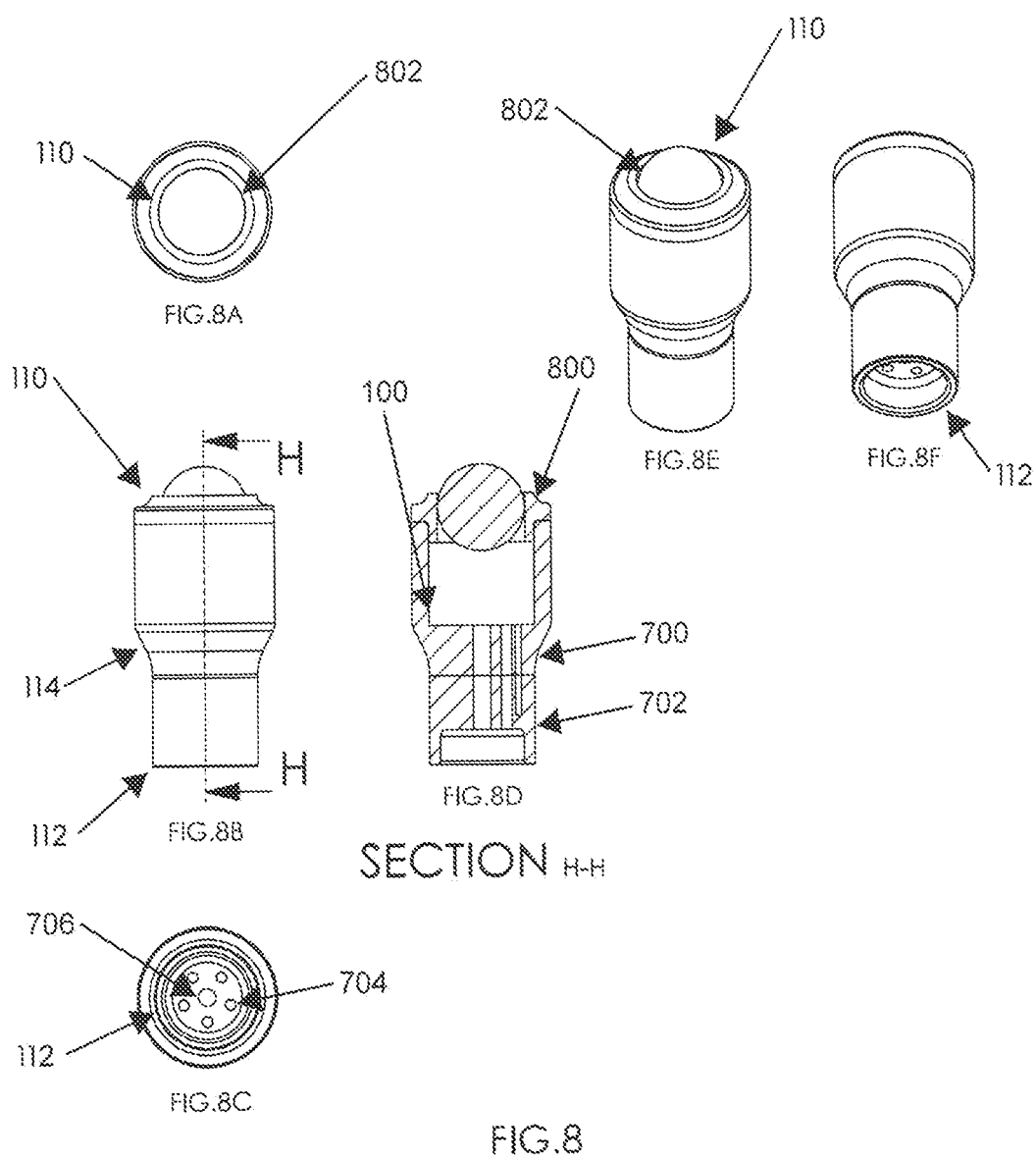
FIG. 8 generally depicts the rotatable dose-style device of FIG. 7 used in conjunction with a roll-on style applicator placed on top of the dosing reservoir.

H. Roll-On Dose Device (FIG. 8)

All of the variants of the dosing device of the present invention can be implemented into a roll-on style device where the dosing reservoir is used in conjunction with a roll-on ball to apply a specific amount of the material directly to a substrate without any need for the user to use their hands to evenly spread the dosed material onto the substrate.

Figure 9:
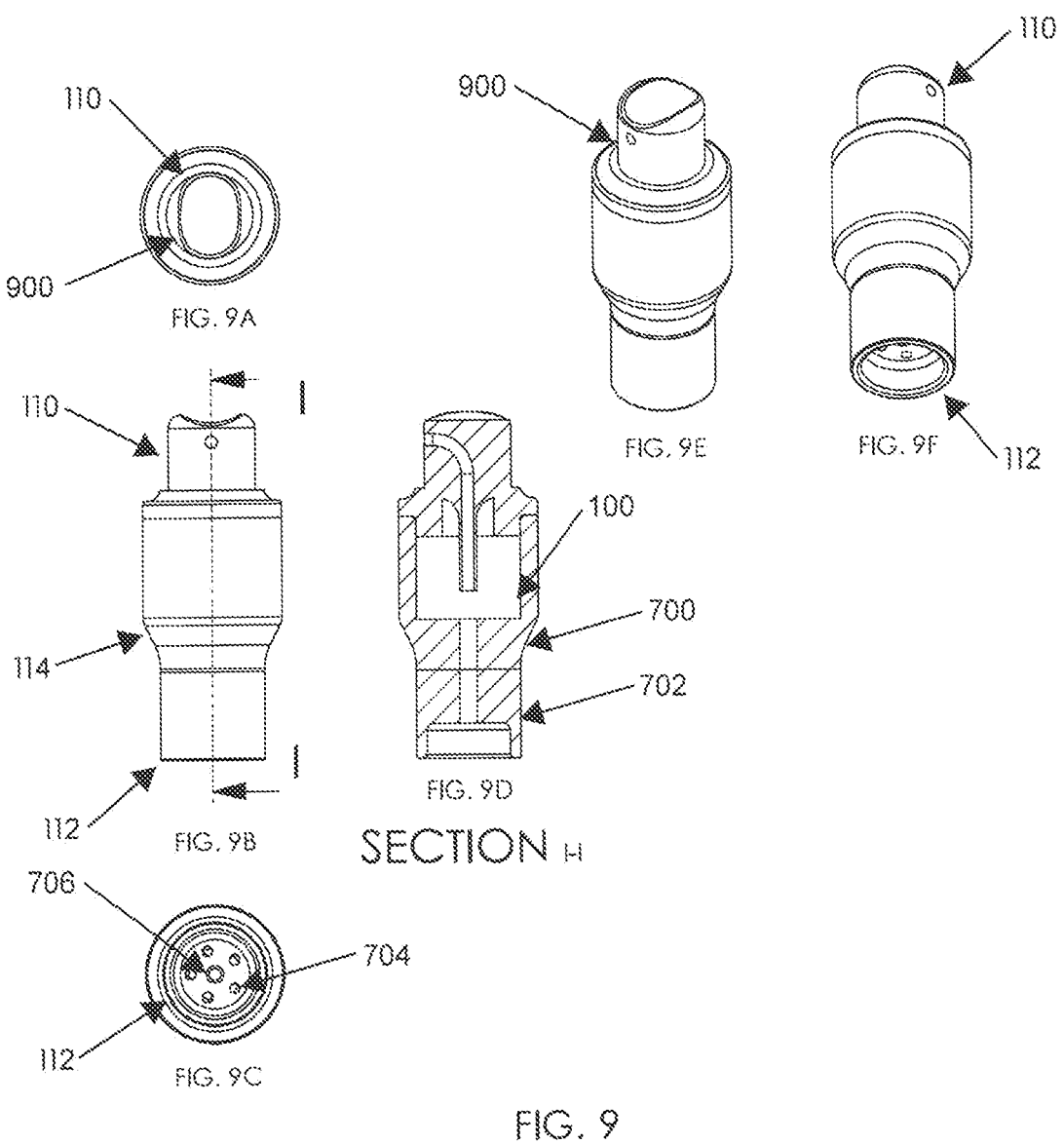
FIG. 9 generally depicts the rotatable dose-style device of FIG. 7 used in conjunction with a spray-on style applicator placed on top of the dosing reservoir.

I. Spray-On Dose Device (FIG. 9)

All of the variants of the dosing device of the present invention can be implemented into a spray-on style device where the dosing reservoir is used in conjunction with a spray-on nozzle (mechanically driven, propellant driven, electrically driven, etc.) to apply a specific amount of the material directly to a substrate without any need for the user to use their hands to evenly spread the dosed material onto the substrate.

J. Brush-On Dose Device (FIG. 10)

All of the variants of the dosing device of the present invention can be implemented into a brush-on style device where the dosing reservoir is used in conjunction with a brush nozzle that is saturated depending on the volume of dose from the dosing reservoir to apply a specific amount of the material directly to a substrate without any need for the user to use their hands to evenly spread the dosed material onto the substrate.

K. Combined Dose Device Design

Any of the dose device designs/technologies/methods of the present invention can be combined with one another to form a hybrid device design to best suit the specific use case.

L. Device Materials

Dosing Container/Housing/Dosing Object can be individually made of the same or different materials, or combinations of materials. Preferred materials include, but are not limited to:
 Polymers
 Plastics
 Rubbers/Silicones. Natural or Synthetic
 Metals (Ferrous and Non-Ferrous for example)
 Glass
 Ceramics
 Composites Example 2

Manufacturing Methods

The individual portions of the device of the present invention, or the device as a whole, or in part, can be manufactured using several different methods, or in some instances one method. For low volume, one off, and unique production uses, the device can be additively manufactured (3D printed) using either polymer or metallic 3D printers, Fused Deposition Modeling (FDM) printers, Selective Laser Sintering (SLS) printers, Binder Jetting Printers, Stereolithography (SLA) printers, Digital Light Projection (DLP) can all be used to manufacture this device additively either using metallic or polymer materials. Additional manufacture methods include but are not limited to blow molding, subtractive manufacturing, such as but not limited to machining, and the like. For large production uses, this device can be made using polymer injection molding or metal injection molding.

Example 3

Device Applications

The device of the present invention can be used in several different industries that use medium to low viscosity liquids for liquids that need to be dosed in a relatively more specific quantity. High viscosity liquids are also contemplated. Typical viscosities include, but are not limited to, 1.000 to 2,000 centipoise to allow the substance to flow properly. The devices of the present invention can also be modified for use in industries that dose powders, pellets, and other non-liquid substances.

The industries and applications these devices can function in include, but are not limited to, the following:
Pharmaceuticals:
 Liquid oral drugs
 Liquid topical drugs
 Liquids including drugs
 Liquid drugs
Nutraceuticals:
 Drink additives and supplements for nutrition or flavoring
 Liquid vitamin supplements
 Liquid mineral/electrolyte supplements
Cooking. Baking, Food:
 Liquid seasonings, flavorings, and extracts
 Cooking oils
 Food coloring
 Alcohol
Personal Hygiene and Toiletries:
 Liquid shampoos and conditioners
 Essential oils
 Moisturizing oils
 Liquid hair products
 Body wash
 Mouthwash and dental care products
 Liquid eye care products
 Skin care products
 Hand sanitizer and personal disinfectants
Household Products:
 Soaps and detergents
 Window cleaners
 Cleaners and disinfectants
 Degreasers and adhesive removers
 Deodorizers
 Liquid waxes and oils
 Wood stains, oils, and varnishes
 Paint and paint removers
 Insect and bug repellent
 Oils for lubrication All publications, including patent documents and scientific articles, referred to in this application and the bibliography and attachments are incorporated by reference in their entirety for all purposes to the same extent as if each individual publication were individually incorporated by reference.

All headings and titles are for the convenience of the reader and should not be used to limit the meaning of the text that follows the heading, unless so specified.

What is claimed is:

1. A ball valve liquid dispensing device, comprising:
 a) at least one proximal end;
 b) at least one distal end;
 c) at least one caged structure; and
 d) at least one ball;
 wherein said proximal end operably engages said caged structure:
 further when said distal end operably engages said caged structure;
 further wherein said ball can operably engage said proximal end, said caged structure and said distal end;
 further wherein when said ball valve device is in operation by being operably engaged with at least one outlet of at least one container comprising at least one compound, wherein:
 a) when in a vertical position with said proximal end facing up, said ball is seated in said distal end of said ball valve device, and b) when inverted or lipped away from up right vertical to allow dispensation of said compound from said container, said ball transverses said caged structure in a timed manner to allow dispensation of an aliquot of compound before said ball operably engages said through hole to prevent further flow of compound.

2. The ball valve device of claim 1, wherein said proximal end comprises at least one through hole to allow flow through of at least one compound.

3. The ball valve device of claim 1, wherein said proximal end is particularly adapted to operably engage at least one outlet of a container comprising said compound.

4. The ball valve device of claim 1, wherein said proximal end is particularly adapted to substantially seal said through hole from flow of said compound when operably engaged therewith.

5. The ball valve device of claim 1, wherein said proximal end comprises at least one concave portion to operably engage said ball.

6. The ball valve device of claim 1, wherein said proximal end comprises polymer, plastic, metal, ceramic, glass, or a combination thereof.

7. The ball valve liquid dispensing device of claim 1, wherein said distal end comprises at least one vent hole to allow fluid flow, gas flow, or a combination thereof.

8. The ball valve device of claim 1, wherein said distal end is partially adapted to not substantially adhere to said ball when in operation.

9. The ball valve device of claim 1, wherein said distal end comprises at least one protrusion to prevent said ball for substantially adhering to said ball when in operation.

10. The ball valve device of claim 1, wherein said distal end comprises polymer, plastic, metal, ceramic, glass, or a combination thereof.

11. The ball valve device of claim 1, wherein said caged structure allows passage of said compound and can prevent air entrapment within said cage structure.

12. The ball valve device of claim 1, wherein said caged structure comprises polymer, plastic, metal, ceramic, glass, or a combination thereof.

13. The ball valve device of claim 1, wherein said ball in configured to slide within and along at least a portion of the length of said caged structure.

14. The ball valve liquid dispensing device of claim 1, wherein said container is made of polymer, plastic, metal, ceramic, glass, or a combination thereof.

15. The ball valve device of claim 1, wherein said compound comprises a liquid.

16. The ball valve device of claim 1, wherein said liquid comprises an edible food stuff, a hand sanitizer, or a detergent.

17. The ball valve device of claim 1, further wherein said aliquot of compound is predetermined.

18. The bail valve device of claim 1, wherein said ball comprises polymer, plastic, metal, ceramic, glass, or a combination thereof.

19. The ball valve device of claim 1, wherein said ball valve device is a unitary structure, or is made of more than one portion and assembled.

20. The ball valve device of claim 1, wherein said ball valve device is operably engaged with a cap or lid.

21. The ball valve device of claim 1, further comprising at least one roll on applicator.

22. A method of dispensing at least one compound from at least one container, comprising:
   a) providing at least one device of claim 1;
   b) providing at least one container comprising at least one compound; c) operably engaging said device with at least one outlet of said container; d) moving said container from a more upright and vertical position to a less upright inverted vertical dispensing position to allow said ball valve to operate to dispense an aliquot of compound;
   e) optionally returning said container to a more vertical position after dispensation of said aliquot of compound.

23. The method of dispensing at least one compound from at least one container of claim 22, wherein said volume of aliquot of compound dispensed from said at least one device is influenced by at least one variable, comprising:
   a) the viscosity of said compound;
   b) the length of the path that the hall travels;
   c) the weight of said ball; and
   d) a combination thereof.

* * * * *